(12) United States Patent
Denny

(10) Patent No.: US 9,251,119 B2
(45) Date of Patent: Feb. 2, 2016

(54) SYSTEM FOR THE EXCHANGE OF OPTICALLY-ENCODED INFORMATION

(71) Applicant: Douglas L. Denny, Plymouth, MN (US)

(72) Inventor: Douglas L. Denny, Plymouth, MN (US)

(73) Assignee: Q-Up Enterprises LLC, Plymouth, MN (US)

( * ) Notice: Subject to any disclaimer, the term of this patent is extended or adjusted under 35 U.S.C. 154(b) by 121 days.

(21) Appl. No.: 13/744,531

(22) Filed: Jan. 18, 2013

(65) Prior Publication Data

US 2013/0186954 A1 Jul. 25, 2013

Related U.S. Application Data

(60) Provisional application No. 61/589,763, filed on Jan. 23, 2012.

(51) Int. Cl.
| | | |
|---|---|---|
| *G06K 19/00* | (2006.01) | |
| *G06F 17/00* | (2006.01) | |
| *G06Q 10/10* | (2012.01) | |

(52) U.S. Cl.
CPC .............. *G06F 17/00* (2013.01); *G06Q 10/107* (2013.01)

(58) Field of Classification Search
USPC .................................. 235/435, 439, 454, 462
See application file for complete search history.

(56) References Cited

U.S. PATENT DOCUMENTS

| | | | |
|---|---|---|---|
| 6,993,573 B2 | 1/2006 | Hunter | |
| 7,478,755 B2 | 1/2009 | Sekiguchi | |
| 7,988,037 B2 | 8/2011 | Yach | |
| 8,033,460 B2 | 10/2011 | Barnes et al. | |
| 8,046,721 B2 | 10/2011 | Chaudhri et al. | |
| 8,069,396 B2 | 11/2011 | Chen et al. | |
| 8,094,870 B2 | 1/2012 | Crookham et al. | |
| 2006/0242234 A1 | 10/2006 | Counts et al. | |
| 2009/0019061 A1 | 1/2009 | Scannell, Jr. | |
| 2011/0101086 A1* | 5/2011 | Yach | 235/375 |
| 2011/0319016 A1 | 12/2011 | Gormley et al. | |
| 2012/0061460 A1* | 3/2012 | Mackley et al. | 235/375 |

* cited by examiner

*Primary Examiner* — Matthew Mikels
(74) *Attorney, Agent, or Firm* — Craige Thompson; Thompson Patent Law

(57) ABSTRACT

Apparatus and associated methods may relate to a coded contact information exchange made between source and target electronic devices. In an exemplary embodiment, the coding scheme may be a non-industry standard coding scheme. In an illustrative example, one or more contact fields comprising user contact information are encoded in a barcode format for exchange between the devices. In some examples, the barcode may be transmitted over a non-optical communications link. In other examples, the encoded barcode may be transmitted over an optical communications link. In some examples, the barcode may comprise a two-dimensional barcode. In some examples, the source and target devices may comprise handheld devices, such as mobile phones.

20 Claims, 12 Drawing Sheets

SYSTEM FOR THE EXCHANGE OF OPTICALLY-ENCODED INFORMATION

CROSS-REFERENCE TO RELATED APPLICATIONS

This application claims priority to the following applications, each of which is fully incorporated by reference herein: U.S. application Ser. No. 61/589,763 Non-Optical Exchange of Optically Jan. 23, 2012 Encoded Information

TECHNICAL FIELD

Various embodiments relate generally to apparatus and methods for transferring information, such as contact information, over a communication link.

BACKGROUND

Many people exchange contact information every day. Contact information is commonly exchanged during business occasions as well as personal occasions. There are many tools for recording and storing contact information. One tool for storing contact information may be a paper address book. Another more modern tool for storing contact information may be an electronic device. With the ever-increasing fast-paced society, it is becoming more and more vital to effectively maintain accurate records of contact information.

SUMMARY

Apparatus and associated methods may relate to a coded contact information exchange made between source and target electronic devices. In an illustrative example, one or more contact fields comprising user contact information are encoded in a barcode format for exchange between the devices. For example, the source device may employ a coding scheme for encoding user contact information in a barcode to be transmitted to the target device which also employs the coding scheme for decoding the transmitted barcode for storing the contact information. In some examples, the barcode is transmitted over a non-optical communications link. In other examples, the encoded barcode is transmitted over an optical communications link. In an exemplary embodiment, the coding scheme may be a non-industry standard coding scheme. In some examples, the barcode may comprise a two-dimensional barcode. In some examples, the source and target devices may comprise handheld devices, such as mobile phones.

In accordance with an exemplary embodiment, a first user contact information may be encoded in a two-dimensional barcode format and displayed upon the screen of the source device. The barcode may be transmitted over a non-optical communications link to the target device via a wireless connection made between the source device and the target device. For example, the source device and the target device may employ software functionality to enable a secure connection between the devices. The encoded barcode may be transmitted via the communications link using a short-wavelength medium. In some examples, once the barcode is received by the target device, the target device may employ the same non-industry standard coding scheme for decoding the barcode that was used by the source device to encode the contact information in the barcode format. Once the contact information is decoded, the target device may be enabled to store the relevant contact fields in a data store of the target device.

In accordance with another exemplary embodiment, the communications link may comprise an optical communications link. For example, the barcode may be portrayed on the display of the source device and read via an image reader on the target device. In some exemplary embodiments, an optical communications link provided by the image reader may advantageously avoid communication problems between electronic handheld devices having different operating systems. In some examples, the image reader may comprise a mobile device camera.

Various embodiments may achieve one or more advantages. For example, a user may enable one or more contact fields upon the source device for transmission to the target device. For example, a physical address field of a first user on the source device may be disabled to restrict encoding of the respective field in the barcode format and thus restrict transmission of the physical address field to the target device. In some examples, the target device may be configured to parse the decoded contact information to determine one or more contact fields to populate with the decoded contact information within the data store of the target device. In some examples, a tag including a time and a location of the contact exchange may be encoded in the barcode and transmitted to the source device for storage with the contact fields of the user contact information.

In some examples, a notification signal may be provided to the source and target devices once the barcode information is successfully transmitted to the target device. For examples, a vibratory signal may be provided to both the source device and the target device upon successful transmission of the contact information.

The details of various embodiments are set forth in the accompanying drawings and the description below. Other features and advantages will be apparent from the description and drawings, and from the claims.

BRIEF DESCRIPTION OF THE DRAWINGS

Like reference symbols in the various drawings indicate like elements.

DETAILED DESCRIPTION OF ILLUSTRATIVE EMBODIMENTS

To aid understanding, this document is organized as follows. First, diagrams and flowcharts briefly introduce exemplary embodiments of a contactless system for exchanging contact information encoded according to a barcode algorithm, with reference to FIGS. 1-4. Then, with reference to FIGS. 5-14, a series of exemplary in-use views and a flowchart detail an exemplary process for using the exemplary embodiments of the system. Next, with reference to FIG. 15, an exemplary system illustrates use of an optical communication link with contact information encoded according to a proprietary bar code algorithm. Finally, FIG. 16 illustrates an exemplary system integration using a secure contact exchange system for customer relations management, including real-time delivery of promotional and/or marketing content messages responsive to presence in a retail store environment.

Figure 1:
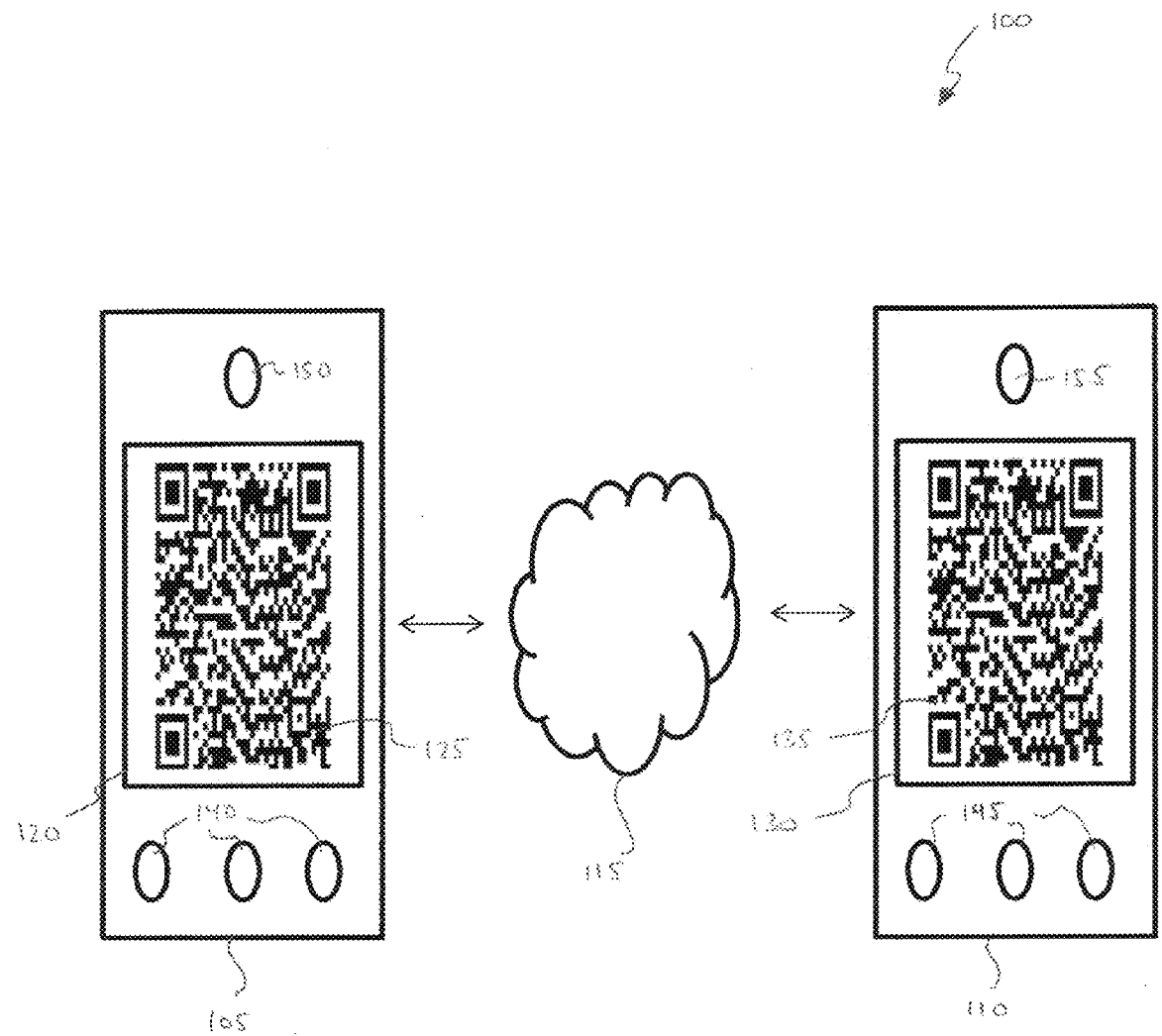
FIG. 1 depicts a diagram of an exemplary system of exchanging optically-encoded information via a non-optical communication link.

FIG. 1 depicts an exemplary system of exchanging optically-encoded information via a non-optical communication link. A system 100 for exchanging optically-encoded information includes a first device 105 and a second device 110 connected by a non-optical communication link 115. The first device 105 and/or the second device 110 may each comprise an electronic handheld device, such as a wireless mobile phone. In some exemplary embodiments, the first device 105 and/or the second device 110 may comprise a computer, notebook, or electronic tablet. The communication link 115 may comprise a local area network in some exemplary embodiments. In other exemplary embodiments, the communication link 115 may comprise a wide area network. In some exemplary embodiments, the communication link 115 may comprise short-wavelength radio transmissions, such as for example a Bluetooth configured transmission. In some exemplary embodiments, the communication link 115 may comprise a wireless transmission and in other exemplary embodiments, the communication link 115 may comprise a wired transmission.

The first device 105 includes a first display screen 120. The first display screen 120 is configured for displaying a first barcode information 125 representative of contact information encoded by the first device 105. The contact information encoded in the first barcode information 125 may be associated with a first user, such as for example the user having ownership possession of the first device 105. The second device 110 includes a second display screen 130. The second display screen 130 is configured for displaying a second barcode information 135 representative of contact information encoded by the second device 110. The contact information encoded in the second barcode information 135 may be associated with a second user, such as for example the user having ownership possession of the second device 110. The first barcode information 125 and the second barcode information 135 are configured as a two dimensional matrix of indicia, such as for example a Quick Response (QR) code.

Although the depicted embodiment shows screen displays 120, 135, transmission and/or reception of bar-encoded messages may occur without being rendered on a display. Various embodiments may perform the message processing functions described herein with or without a display screen, such as the displays 120, 135. Unidirectional transmissions may be automatically sent in response to an appropriate request, for example, if an automatic response mode is authorized by the user.

In an exemplary embodiment, the barcode information 125, 135 may be encoded and decoding using a non-industry standard coding scheme. The coding scheme may be useful in encoding contact information to barcode information 125, 135 using the coding engine operated by the source electronic handheld device 105 and transmitting the barcode information to the target electronic handheld device 110 for decoding the barcode information using the decoding engine.

In an exemplary embodiment, the coding scheme may be stored on the first device 105 and the second device 110 via mobile program application software (e.g., app). The software may include the proprietary coding scheme which is non-industry standard such that other software applications cannot decode the encoded contact application. By using a non-industry standard coding scheme and software application, the coding scheme may be operated across different operating systems (e.g., platforms) such that users having electronic devices using different operating systems may be able to exchange encoded contact information using the system. By employing a proprietary without the cross-platform incompatibilities that currently make this approach using industry standard impracticable, for example.

Also shown on the electronic handheld devices 105, 110 are user input controls 140, 145 and image readers 150, 155, such as, for example, an image and/or video camera. In other exemplary embodiments, as will be described, the barcode information may be read on another electronic handheld device by the image readers 150, 155. In some exemplary embodiments, an optical communications link from the display screen 120 to the image reader 155, or from the display screen 135 to the image reader 150, may advantageously avoid communication problems, such as cross-platform compatibility issues that exist between popular electronic handheld devices having different operating systems (e.g., iOS®, Android®).

Figure 2:
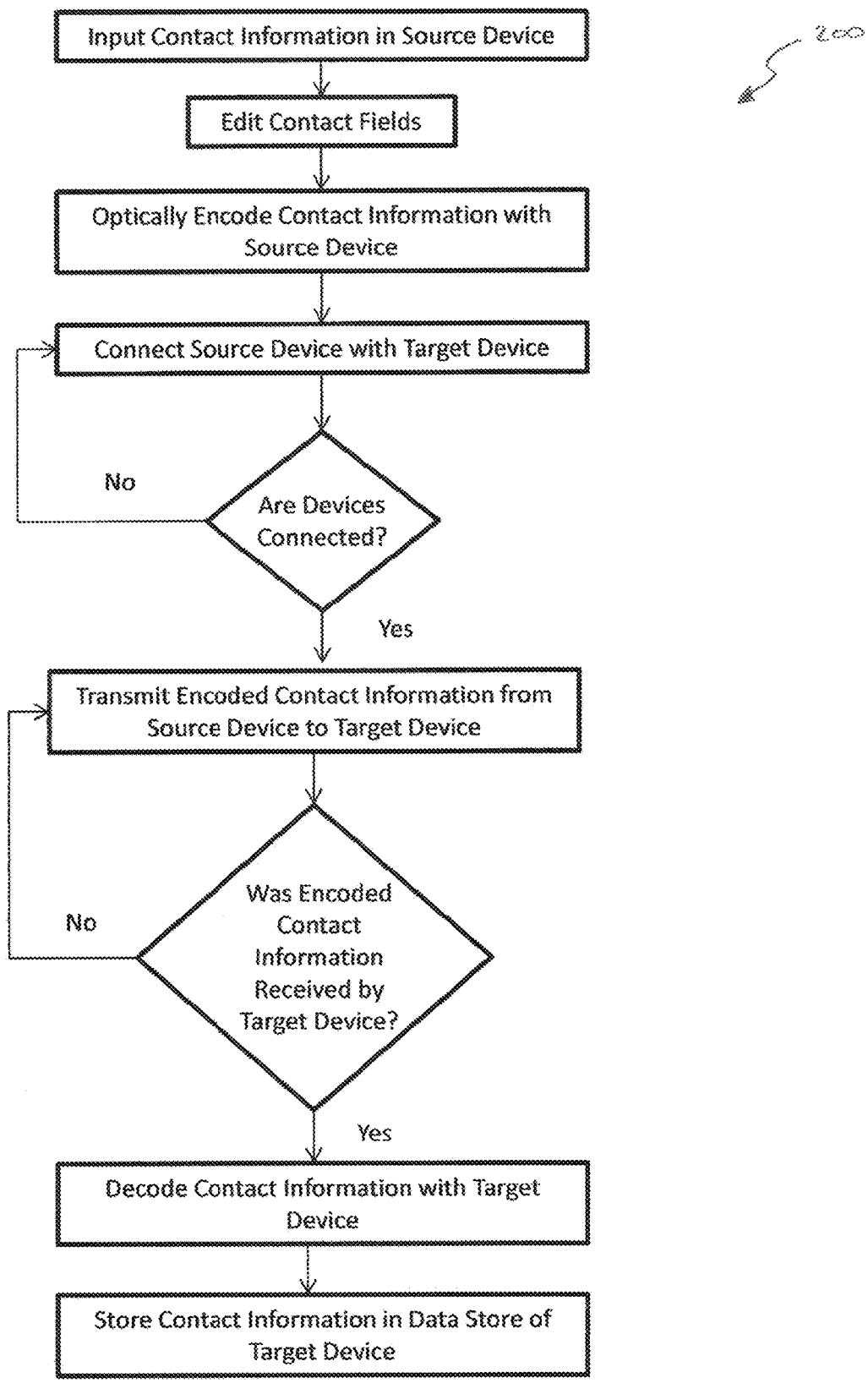
FIG. 2 depicts a flow chart of an exemplary method of transferring contact information from a source device to a target device.

FIG. 2 depicts a flow chart of an exemplary method of transferring contact information from a source device to a target device. A method 200 is illustrated for transferring contact information from a source device to a target device by encoding contact information, transmitting the encoded contact information from the source device to the target device, and then decoding the transmitted contact information for storage in the target device. More specifically, a user first enters their contact information into the source device. In some exemplary embodiments, a virtual keyboard may be used to enter contact information. In other exemplary embodiments, a tactile keyboard may be used to enter contact information. The user may also edit one or more contact fields, such as, for example, by turning each contact field on or off depending on a preference for transmitting contact information associated with the respective contact field to the intended target device.

Once all desired contact fields are populated and selectively turned on or off, the selected contact information is optically encoded using a coding scheme operated by a coding engine on the source electronic handheld device. The coding scheme may be configured in a non-industry standard manner. The contact information is encoded in barcode information, such as, for example, a two-dimension matrix indicia.

Once the contact information is encoded to the barcode information, a connection process begins between the source device and one or more target devices. For example, a connection process may include wirelessly connecting the source device and target devices to a wireless communication signal, such as a short-wavelength signal provided by Bluetooth technology. Once the source device and target device are connected, the encoded contact information is transmitted from the source device to the target device. The encoded contact information may be transmitted in a non-optical communication link as barcode information to the target device.

Once the barcode information is received by the target device, a decoding engine programmed to decode the received barcode information and operated by the target device uses the non-industry standard coding scheme to recover the contact information from the barcode information. The recovered contact information is then stored in a data store of the target device, such as for example internal memory of the target device. The data store may be accessible by a contact information module of the target device in response to a retrieval command by the user. An exemplary contact information module may comprise an electronic contact list or address book. In some examples, if a different coding scheme is used that is not intended to decode the contact information, the software may lockout or prevent further functionality.

Figure 3:
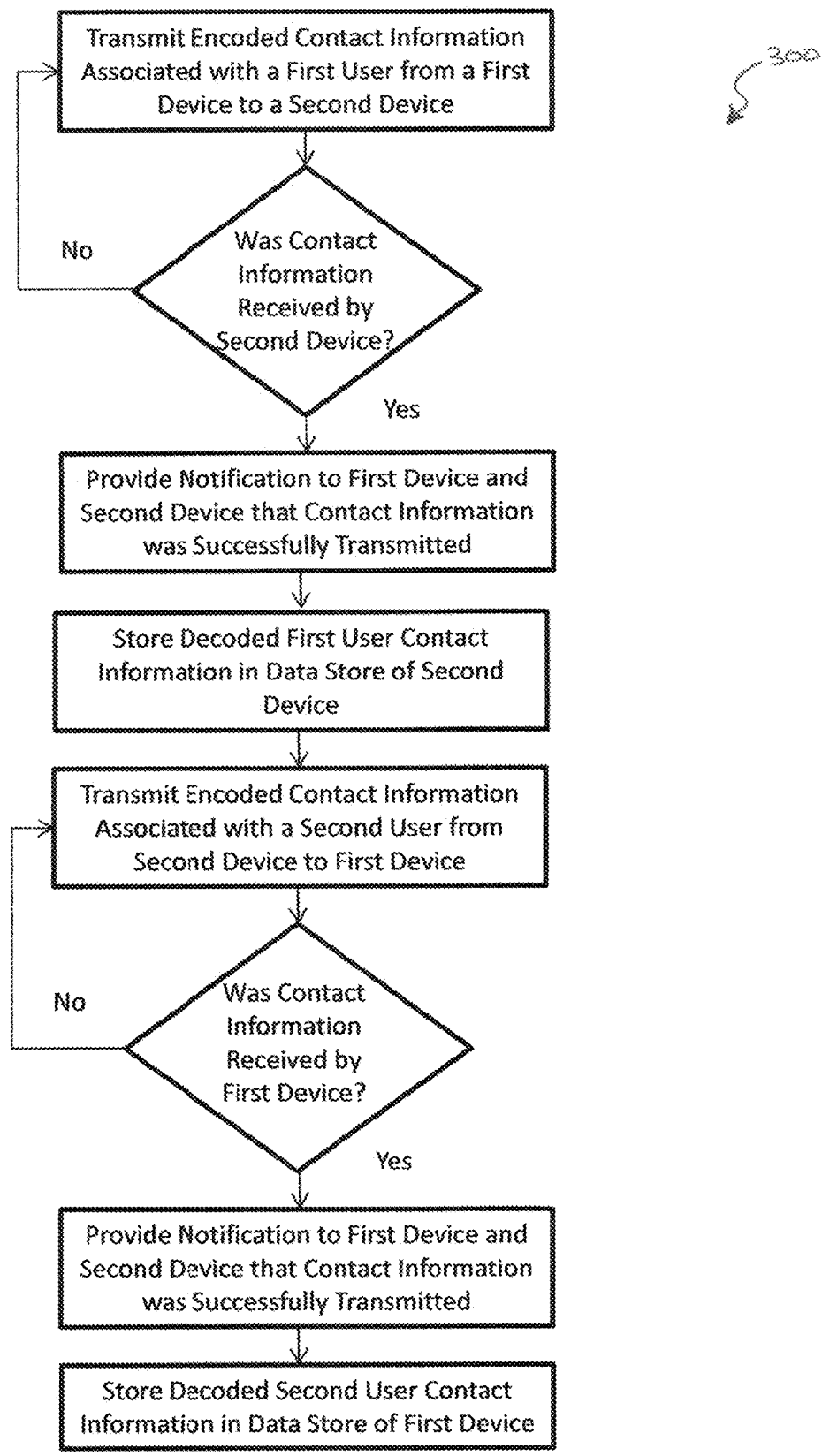
FIG. 3 depicts a flow chart of an exemplary method of optically transferring contact information bidirectionally between a first device and a second device.

FIG. 3 depicts a flow chart of an exemplary method of optically transferring contact information bidirectionally between a first device and a second device. A method 300 includes transmitting encoded contact information from a first device to a second device. As stated earlier, the first device and the second device may comprise electronic handheld devices and the encoded contact information may be in the form of a barcode.

Once the encoded contact information representative of a first user having the first device is received by the second device, a first notification signal is made to the first device and the second device. In some exemplary embodiments, the notification may include a vibratory signal to the first device and/or the second device. In other exemplary embodiments, the notification may include an audible signal to the first device and/or the second device. In some implementations, the notification signal may include an optical indicia displayed on the display screen. In response to detecting this optical indicia, the first and second devices may execute a program of instructions to cause the transmission sequence to be deemed complete. In some examples, in response to detection of a communication error (e.g., upon failure of a checksum test), one of the devices may display indicia to notify the other and/or the user of a failure. In some examples, a retry may be automatically attempted. User intervention may control the initiation or number of retry attempts.

The second device then proceeds through similar steps to transmit contact information associated with the second user to the first device. Once transmission is complete of the encoded contact information, another notification signal may be made to the first device and/or the second device.

Figure 4:
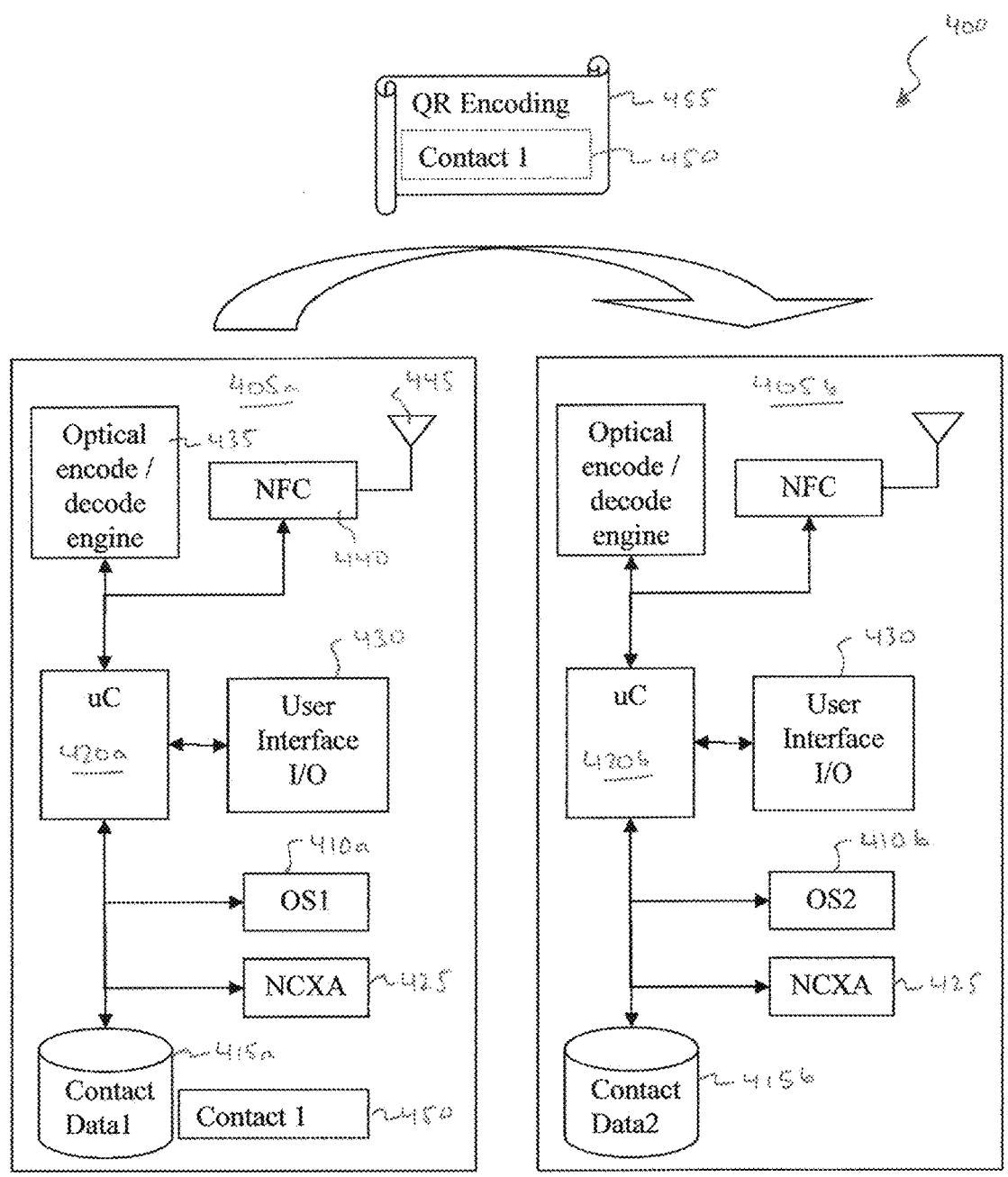
FIG. 4 depicts a block diagram of an exemplary pair of mobile devices configured to exchange contact information encoded in an optical encoding format and transmitted via a non-optical communication link.

FIG. 4 depicts a block diagram of an exemplary pair of mobile devices configured to exchange contact information encoded in an optical encoding format and transmitted via a non-optical communication link. A pair of devices 400 includes a source device 405a and a target device 405b. In the depicted example, the source device 405a operates to encode selected contact information in an optical encoding format (e.g., bar code) and transmit the encoded information via a non-optical communication channel. The target device 405b receives and processes (e.g., decodes) the contact information for storage and later retrieval.

The source device 405a has data storage devices that store information including an operating system OS1 410a and a contact database 415a. As depicted, the target device 405b has data storage devices that store information including an operating system OS2 410b and a contact database 415b. The operating systems of each of the devices 405a, 405b may be substantially different, even from different incompatible manufacturers, for example. The data stored in the contact databases 415a, 415b may be substantially different, both in format and/or in the actual records stored therein.

Each of the devices 405a, 405b as depicted includes respective microprocessors 420a, 420b, each of which is operationally coupled to the respective data storage devices 410a, 410b and 415a, 415b. Each of the devices 405a, 405b further includes a data store containing instructions that, when executed by the processor 420a, 420b, causes the processor 420 to perform operations to exchange selected contact information encoded in an optical machine readable format via a non-optical communication link. The instructions are depicted as NCXA 425, which may be referred to as a non-optical contact exchange application. In some implementations, such as on a smart phone, the NCXA 425 may commonly be referred to as an "app" or application program, which may be stored in a non-volatile memory, for example.

In operation, the processor 420a on the source device 405a may execute the NCXA 425 in response to user input received via a user interface 430. The user interface 430 may receive user input signals to initiate a contact exchange. The user interface 430 may also receive user input selection as to which portions of contact information to be permitted to send from the source device 405a. An example of user selection of contact information via the user interface 430 is described with reference, for example, to FIG. 4.

In executing the NCXA 425 code, the processor 420a on the source device 405a may retrieve selected contact record data from the contact database 415a for sending to the target device 405b.

Each of the devices 405a, 405b further includes an optical encode/decode engine 435 (hereinafter, "OC/DE 435") arranged to encode information according to a predefined format that can be read using optical scanning techniques, for example. In some examples, the coding format may be a one or two dimensional machine readable bar code. For example, some embodiments may use a QR code (quick response) format, which is a widely accepted format in industry.

After the OC/DE 435 encodes the contact information in an optical encoding format, the processor 420a causes the contact information to be transmitted from the source device 405a by a near field communication interface (NFC) 440 via an antenna 445. In some examples, the NFC 440 may modulate a carrier signal to encode the optically encoded contact information in the non-optical near field signal.

In the depicted example, a user selected record "Contact 1" 450 stored in the contact database 450 may be encoded by the OC/DE 435 and modulated for transmission as a QR Encoded message 455 that includes the information of the contact record 450.

At the target device 405b, the near field signal message 455 is received by the antenna 445 and demodulated by the NFC 440. The recovered optically encoded contact information is decoded by the OC/DE 430 to recover the contact record 450. In operation, the processor 420b executes instructions of the NCXA 425 to process the decoded contact record 450. In the depicted example, the processor 420b may perform operations to store the received contact record 450 into the contact database 415b in accordance with the format and data structures, for example, of the operating system OS2 410b.

Although, for purposes of aiding explanation, the devices 405a, 405b have been described as source and target, respectively, the exchange of contact information may be reversed or bidirectional in response to user input received via the user interface 430 on each of the devices 405a, 405b.

Various embodiments of the foregoing transfer process may advantageously avoid the need to display a code that displaces other human readable information being displayed on a user interface. Some implementations may advantageously eliminate the need for an optical link, with the attendant specific criteria for spacing, spatial alignment, and/or optical path clarity in order to optically transmit and receive data encoded in an optical encoding format. Accordingly various implementations may provide advantages that may, for example, reduce cumbersome manual processes to establish and maintain optical alignment between the source and target devices for a minimum period of time, for example.

Figure 5:
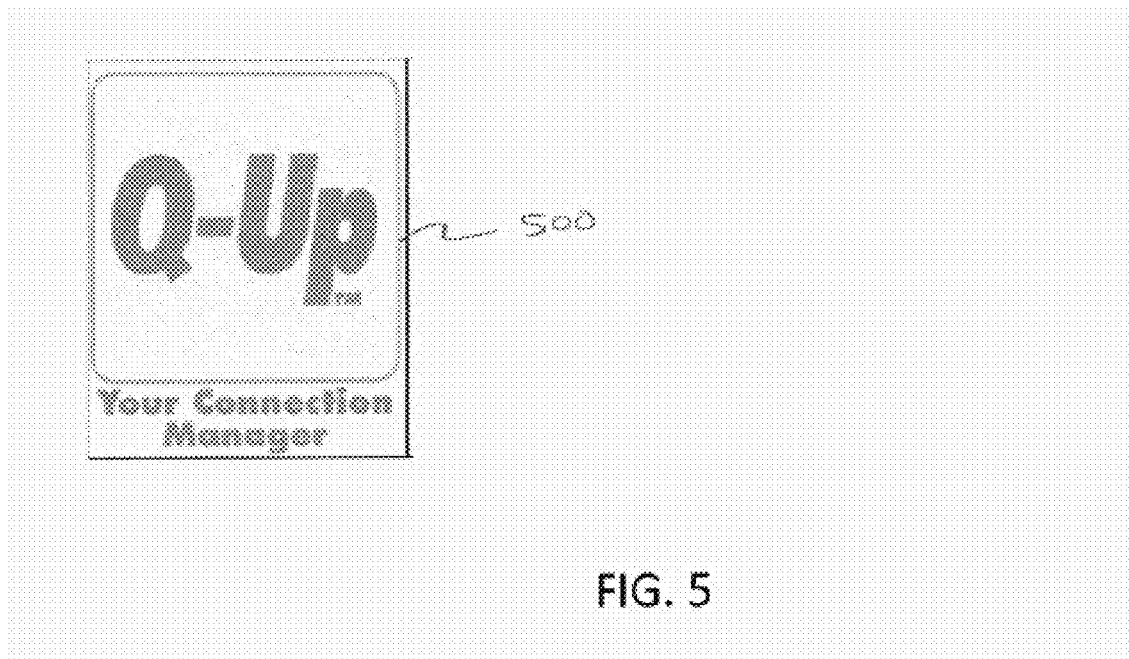
FIG. 5 depicts an icon representing an exemplary user-selected contact information sharing application.
Figure 6:
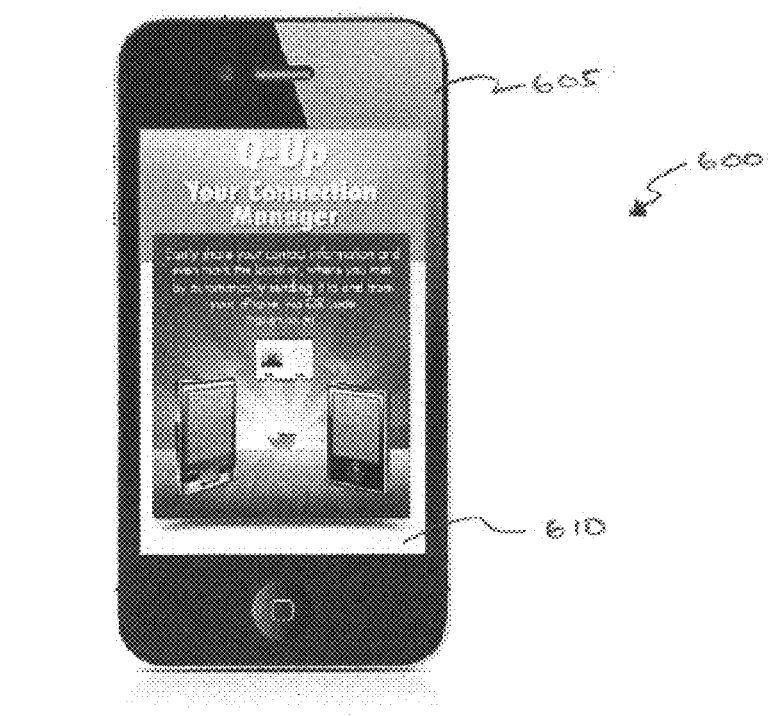
FIG. 6 depicts a smart phone displaying a screen shot of an exemplary user-selected contact information sharing application.

FIG. 5 depicts an icon representing an exemplary user-selected contact information sharing application. FIG. 6 depicts a smart phone displaying a screen shot of an exemplary user-selected contact information sharing application. An exemplary graphic icon 500 for an exemplary user-selected contact information sharing application 600 is shown operating on a smart phone 605 505, such as an iPhone®. Such an icon 500 may be displayed on a virtual storefront, such as on the App Store (iOS), the official Apple online application 600 distribution system for the iPad®, iPhone®, and iPod Touch®. Along with the icon 500, a description of the functionality of the user-selected contact information sharing application 600 may be displayed to educate and entice potential users. Users may then download the application 600 to their smart phone 605 or other mobile computing device.

Once installed on a user's smart phone 605, the icon 500 may be shown on a graphical interface display, or touch screen 610. The touch screen 610 accepts input from the user based on haptic and/or tactile contact. The icon 500 may be displayed on the touch screen 610 as a graphical button, or soft key, to provide the user with a quick and easy way to run the user-selected contact information sharing application 600.

During an initial set up process not shown, the user is prompted to enter in personal contact information. Typical user contact information may include, but is not limited to, the user's name (both first and last), phone numbers (home, cell, and/or work), fax number, email address (including personal and work-related), and a photograph that may be taken via a camera on the smart phone 605.

Figure 7:
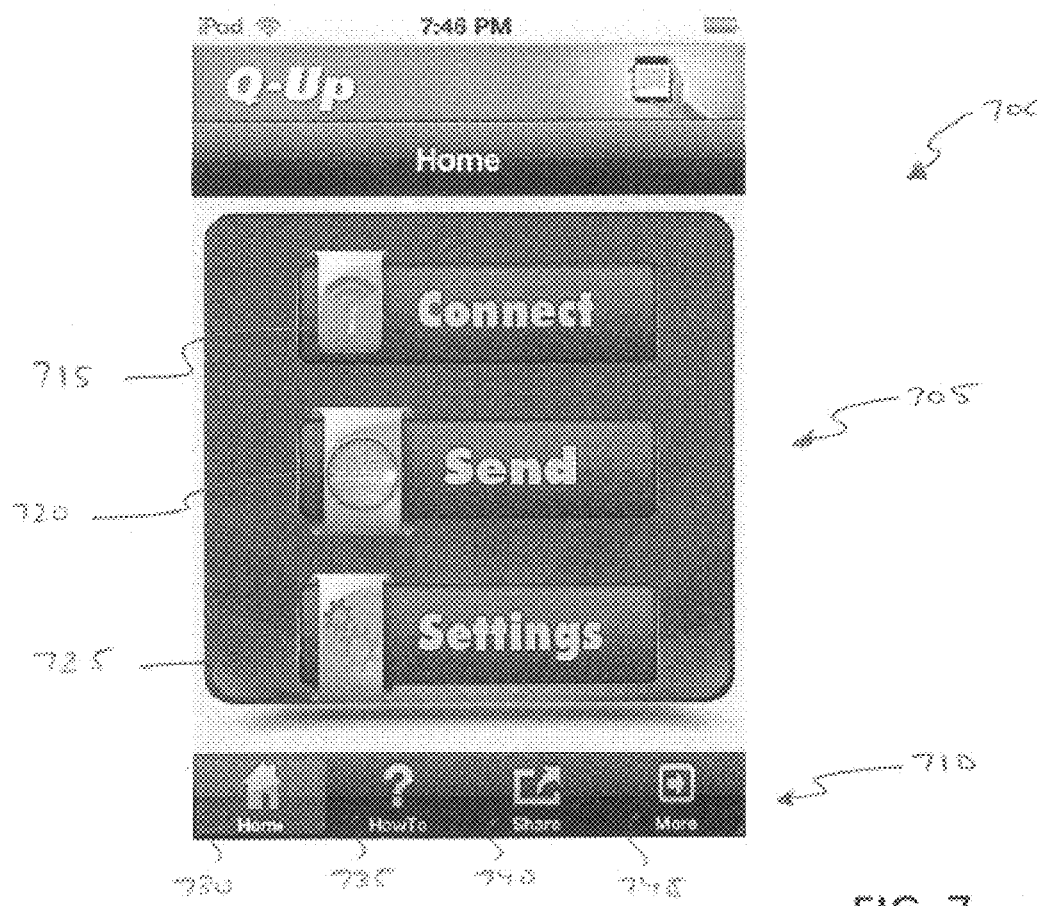
FIG. 7 depicts a user interface displaying an exemplary screen shot of the user-selected contact information sharing application of FIG. 6.

FIG. 7 depicts a user interface displaying an exemplary screen shot of the user-selected contact information sharing application of FIG. 6. In the illustrated embodiment, the home screen 700 includes a primary set of soft keys 705 and a secondary set of soft keys 710. The primary set of soft keys 705 are larger and featured more prominently than the secondary set of soft keys 710 which are smaller and displayed along the bottom of the home screen. The primary set of soft keys 705 includes a "Connect" button 715, a "Send" button 720, and a "Settings" button 725 and allow for the user to choose between different functions of the application. The secondary set of soft keys 710 include a "Home" button 730, a "How To" button 735, a "Share" button 740, and a "More" button 745 and allow the user to navigate between different modes of the application.

Figure 8:
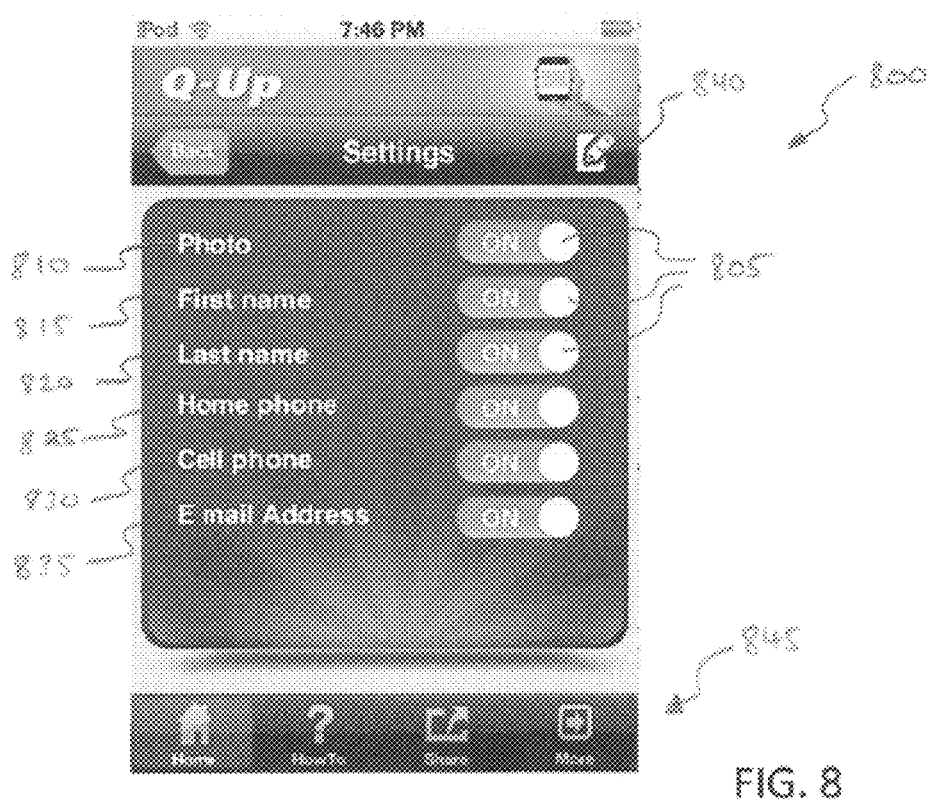
FIG. 8 depicts a screen shot for selecting contact information fields to share with the user-selected contact information sharing application of FIG. 6.

FIG. 8 depicts a screen shot for selecting contact information fields to share with the user-selected contact information sharing application of FIG. 6. An exemplary selection screen 800 to select which contact information fields will be shared with another user via the user-selected contact information sharing application. The selection screen 800 includes several selection soft keys 805, illustrated as toggle switches in an "ON" position. Next to each selection soft key 805 is an identifier representing a specific contact information data field. As illustrated, the selection soft keys are labeled with a "Photo" identifier 810, "First name" identifier 815, "Last name" identifier 820, "Home phone" identifier 825, "Cell phone" identifier 830, and an "E mail Address" identifier 835. The selection screen 800 includes an edit icon 840 that may be selected by the user to add, delete, or modify any of the user's contact information. Also shown on the selection screen 800 are a secondary set of soft keys 845 for navigation as described in reference to FIG. 7.

Figure 9:
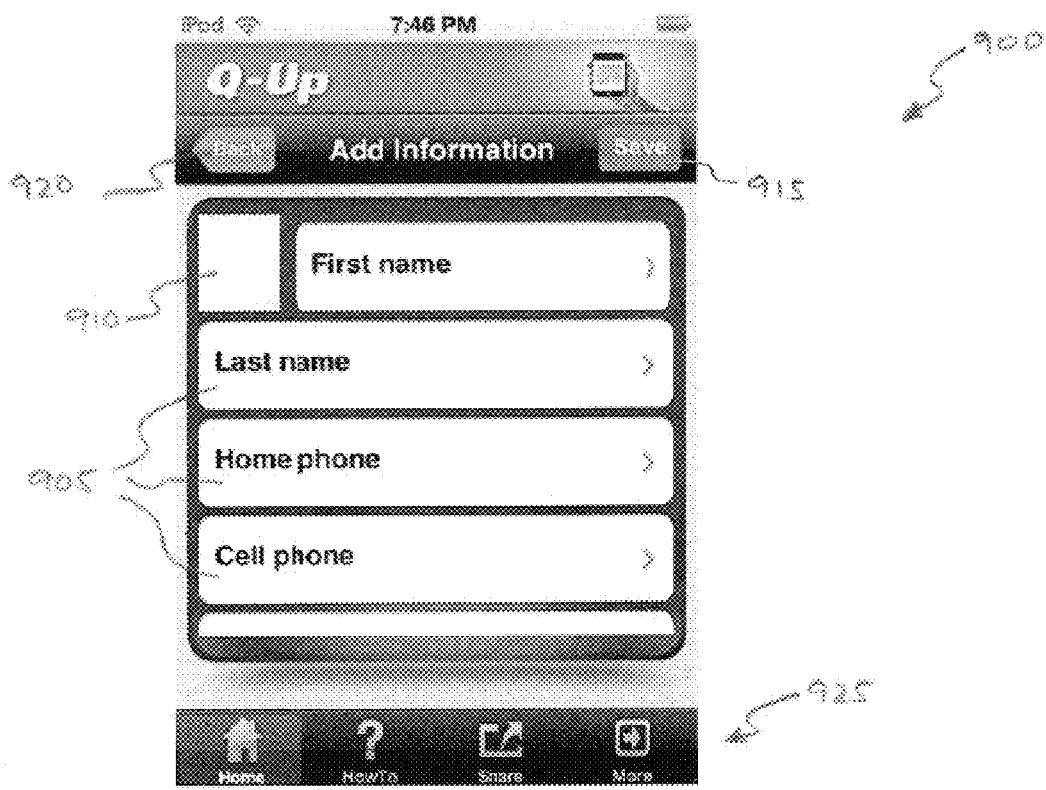
FIG. 9 depicts a screen shot showing exemplary contact information fields selected to be shared via the screen of FIG. 8.

FIG. 9 depicts a screen shot showing exemplary contact information fields selected to be shared via the screen of FIG. 8. An exemplary user contact information screen 900 displaying contact information fields 905 of the user. The data in each contact information field 905 can be inputted by the user as part of the initial set up process described above or edited after selecting the edit icon. A photograph 910 of the user may also be shown on the user contact information screen 900. A "save" soft key 915 is provided to save the user's newly updated or inputted contact information. A "back" soft key 920 is also provided to return to the previous screen. Also shown on the selection screen 900 are a secondary set of soft keys 925 as described in reference to FIG. 7.

Figure 10:
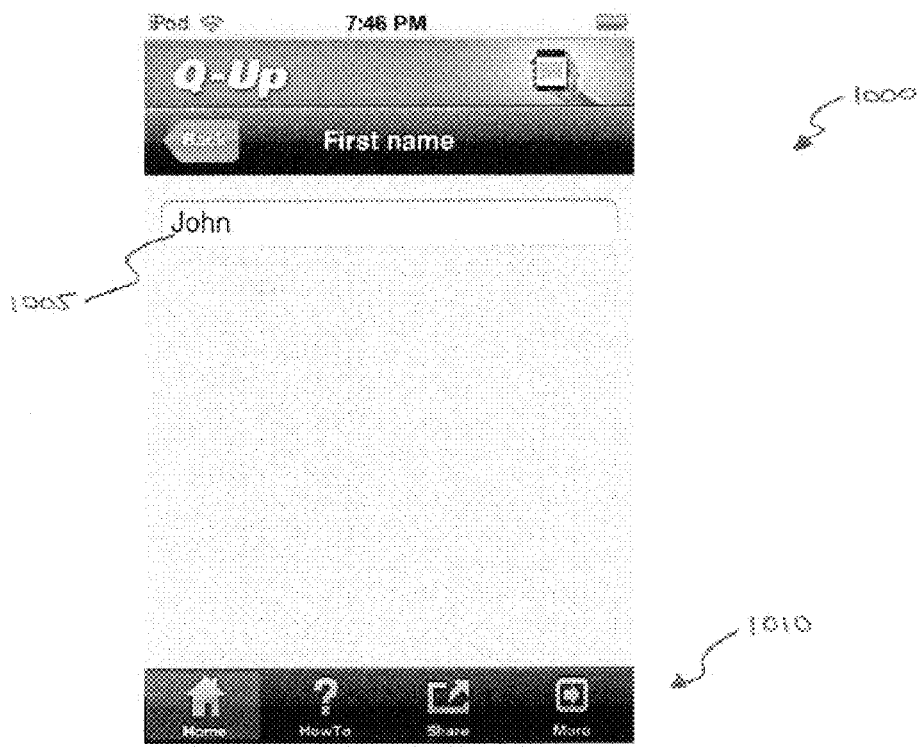
FIG. 10 depicts an exemplary data entry screen shot for one of the user-selected contact information fields of FIG. 9.

FIG. 10 depicts an exemplary data entry screen shot for one of the user-selected contact information fields of FIG. 9. An exemplary data entry screen 1000 is shown for one of the user contact information fields of FIG. 5. Data 1005, (illustrated here as a first name of "John") may be entered or modified within each contact information field via a virtual or actual keyboard (not shown) associated with the smart phone. Also shown on the selection screen 1000 are a secondary set of soft keys 1010 for navigation as described in reference to FIG. 7.

Figure 11:
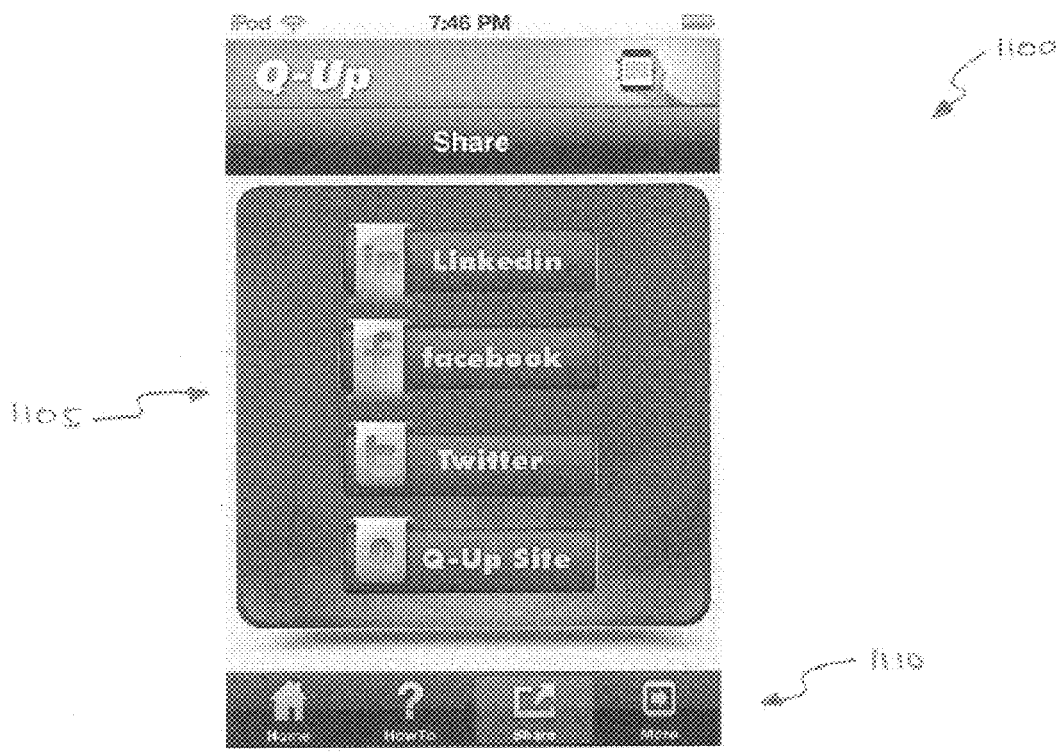
FIG. 11 depicts an exemplary screen shot for selecting how to share the user-selected contact information fields of FIG. 9.

FIG. 11 depicts an exemplary screen shot for selecting how to share the user-selected contact information fields of FIG. 9. An exemplary contact information sharing screen 1100 is shown in FIG. 11. The sharing screen 1100 includes a number of sharing soft keys 1105 to allow the user to share their contact information via a social networking or similar site such as LinkedIn®, Facebook®, Twitter® or a Q-Up™ website. Also shown on the selection screen 1100 are a secondary set of soft keys 1110 for navigation as described in reference to FIG. 7.

Figure 12:
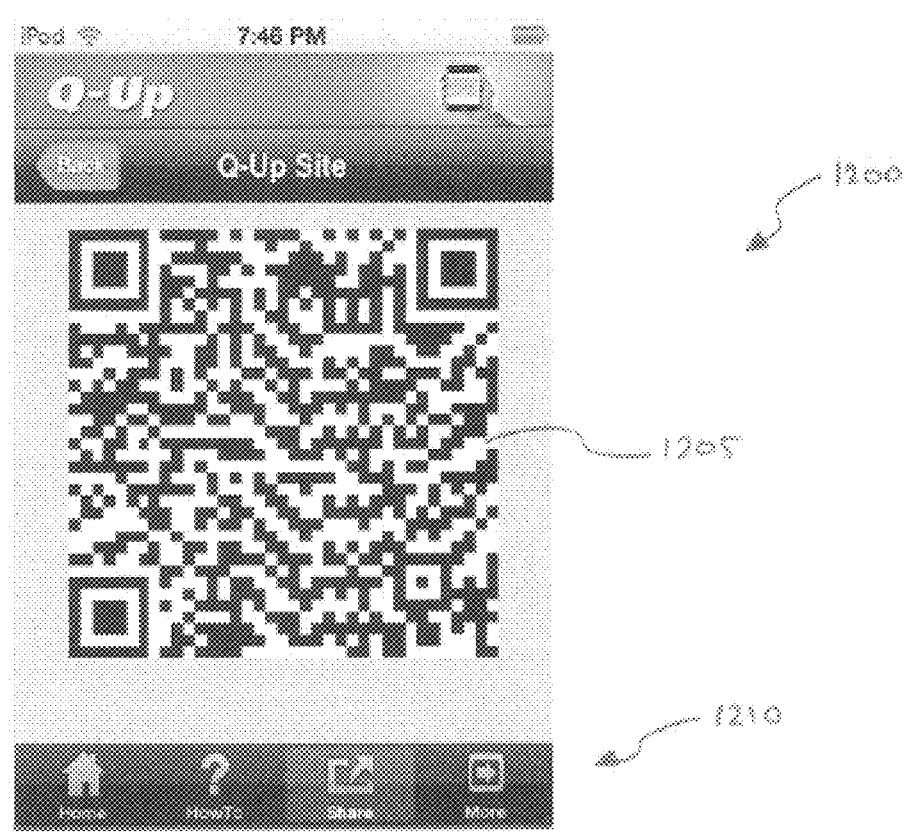
FIG. 12 depicts an exemplary two-dimensional barcode generated for display by the user-selected contact information sharing application of FIG. 6 and containing the user-selected contact information fields of FIG. 9.

FIG. 12 depicts an exemplary two-dimensional barcode generated for display by the user-selected contact information sharing application of FIG. 6 and containing the user-selected contact information fields of FIG. 9. A barcode display screen 1200 illustrates a two-dimensional barcode 1205 is shown that is generated by the user-selected contact information sharing application and includes the user's contact information selected via the selection screen of FIG. 8. The illustrated barcode 1205 is a QR code, but could be generated using any two-dimensional barcode protocol. Also shown on the selection screen 1200 are a secondary set of soft keys 1210 for navigation as described in reference to FIG. 7.

Figure 13:
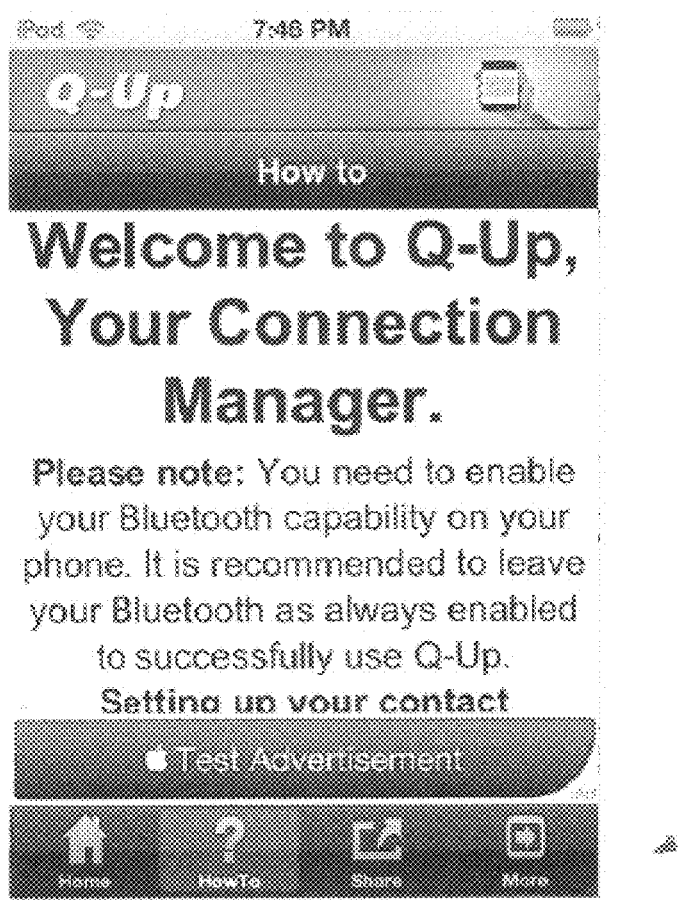
FIG. 13 depicts an exemplary help screen for the user-selected contact information sharing application of FIG. 9.

FIG. 13 depicts an exemplary help screen for the user-selected contact information sharing application of FIG. 9. An exemplary help screen 1300 is shown that may be displayed after the user selects the "How To" button. Any number of additional topics may be provided to assist the user in properly using the contact sharing application. Also shown on the selection screen 1300 are a secondary set of soft keys 1305 for navigation as described in reference to FIG. 7.

Figure 14:
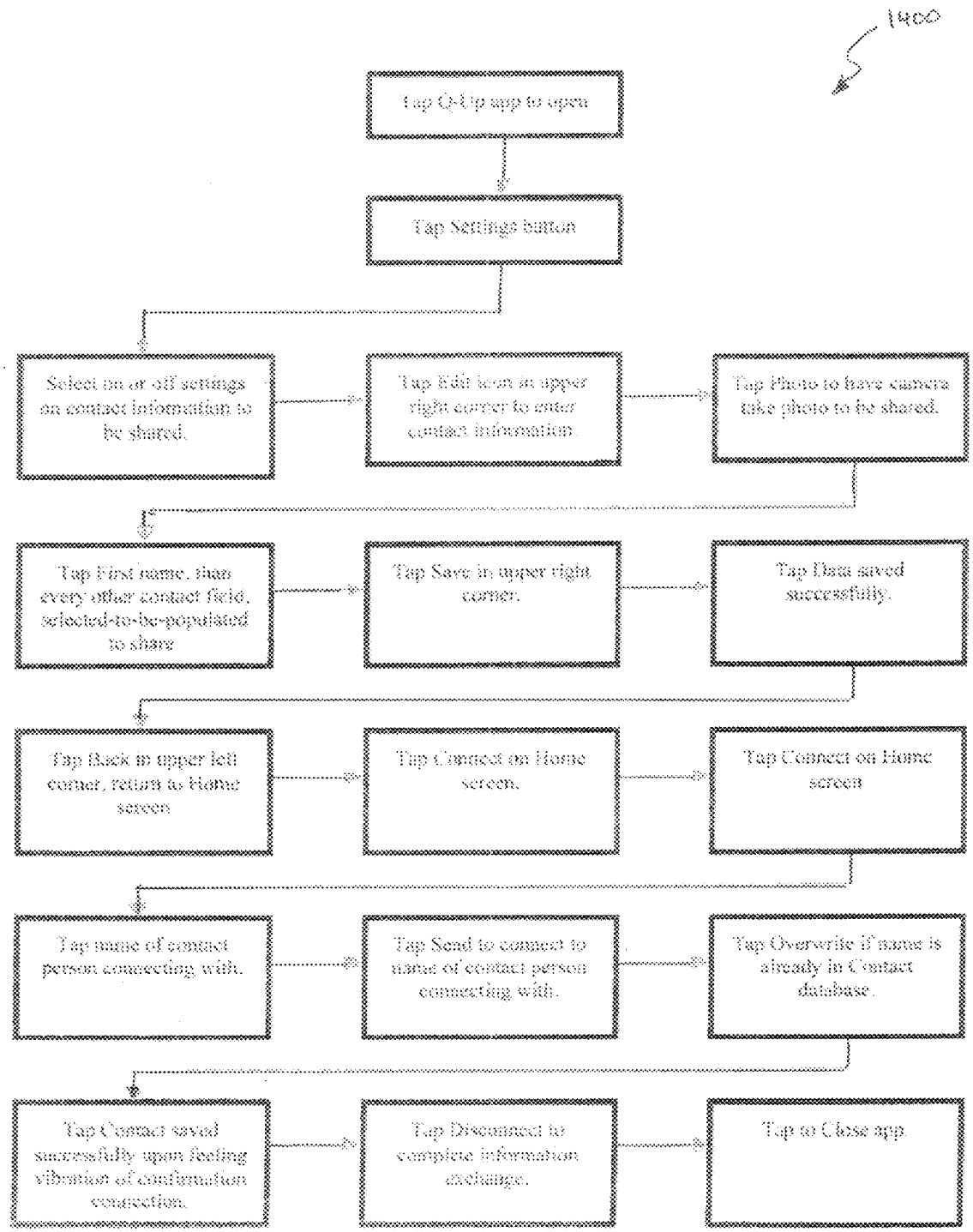
FIG. 14 depicts a flow chart of an exemplary method of sharing user-selected contact information.

FIG. 14 depicts a flow chart of an exemplary method of sharing user-selected contact information. A method 1400 illustrated by a flow chart is shown for sharing of selected contact information from the smart phone of the user to the smart phone of another user. In operation, the user selects the icon on their smart phone to load the user-selected contact information sharing application. After the home screen is displayed, the user selects the Settings soft key to bring up the selection screen.

The user then selects the contact information they wish to share via the toggle switches on the selection screen. If necessary, the first user selects the edit icon to update or modify any of their contact information via the user contact information screen. The user may also have a new photograph taken if desired. Alternatively, the application may automatically direct the user to the user contact information screen where the user will select each field to be populated with their contact information. After the fields of the contact information screen are filled, the user selects the save soft key.

After an indication that the contact information was successfully saved, the user selects the back soft key to return to the home screen. The user then selects the Connect soft key two times, such as with a "tapping" motion. The user then selects the name of the other user and selects the Send soft key. An "overwrite" prompt may be displayed if the user's contact information has already been provided.

A "Contact saved successfully" prompt will be displayed and is selected by the user after the application indicates that the transfer of contact information is complete, such as by causing the smart phone to vibrate. Finally, the user selects the Connect soft key again to disconnect from the other user's smart phone. The user may then provide selected contact information with another user or exit the user-selected contact information sharing application.

The user-selected contact information sharing application allows for contact information to be pre-approved by a user, encoded into a two-dimensional barcode and shared directly and securely with another user in a vCard (.vcf file) format wirelessly, such as with Bluetooth. The application allows for total discretion, complete security, and control with regard to where, when and with whom selected contact information is shared.

Figure 15:
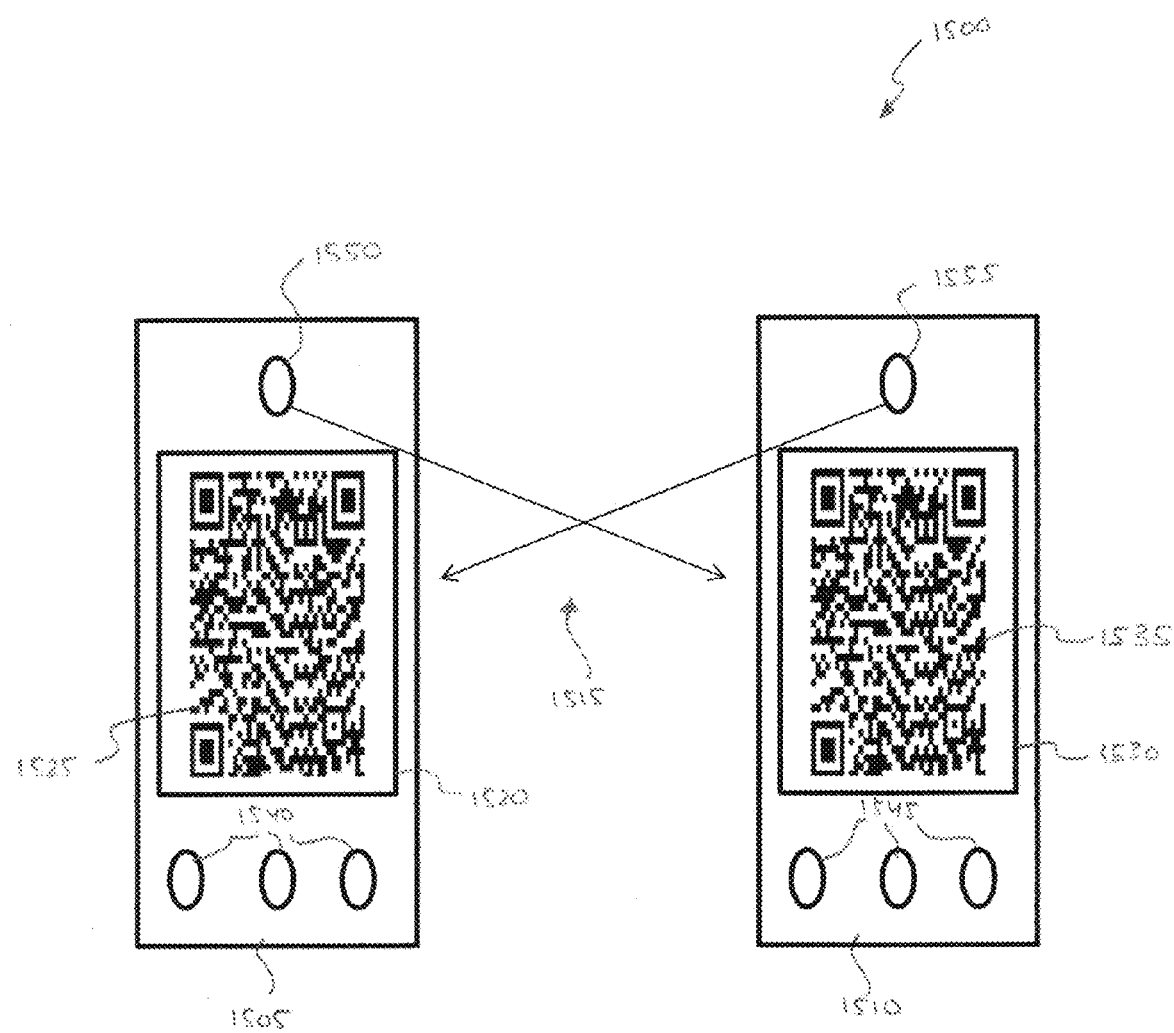
FIG. 15 depicts a diagram of an exemplary system of exchanging optically-encoded information via an optical communication link.
Figure 16:
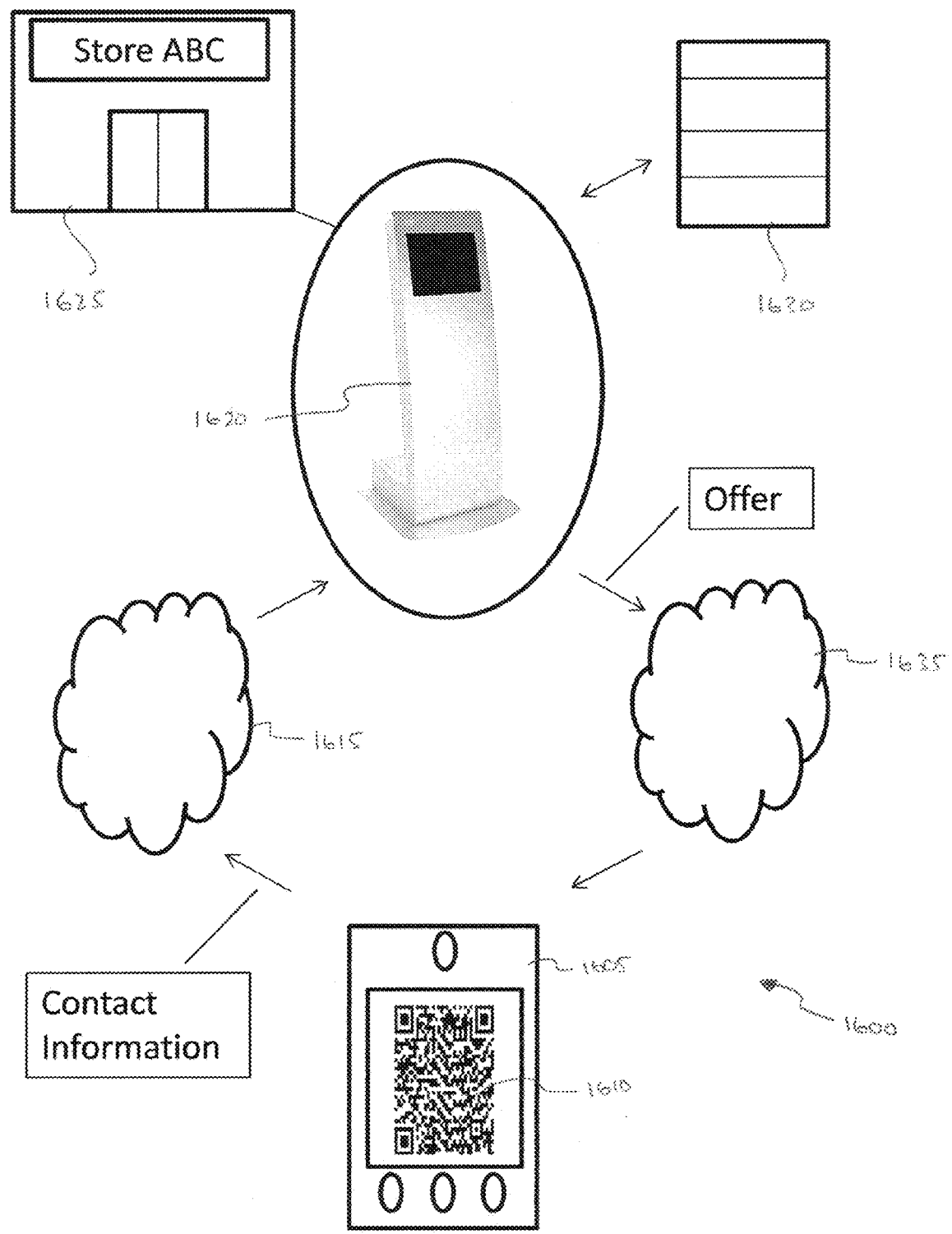
FIG. 16 depicts a diagram of an exemplary customer-business interaction system.

FIG. 15 depicts a diagram of an exemplary system of exchanging optically-encoded information via an optical communication link. A system 1500 for exchanging optically-encoded information includes a first device 1505 and a second device 1510 connected by a communication link 1515. The first device 1505 and/or the second device 1510 may each comprise an electronic handheld device, such as a wireless mobile phone. In various examples, the devices 1505, 1510 may each include a pre-programmed set of stored executable instructions, that when executed by a processor, may cause operations to be performed to handle information exchange using, for example, two dimensional bar encoded algorithms, examples of which are described herein. In some exemplary embodiments, the first device 1505 and/or the second device 1510 may comprise a computer, notebook, or electronic tablet. In the depicted example, the communication link 1515 is an optical communication link.

The first device 1505 includes a first display screen 1520. The first display screen 1520 is configured for displaying a first barcode information 1525 representative of contact information encoded by the first device 1505. The contact information encoded in the first barcode information 1525 may be associated with a first user. The second device 1510 includes a second display screen 1530. The second display screen 1530 is configured for displaying a second barcode information 1535 representative of contact information encoded by the second device 1510. The contact information encoded in the second barcode information 1535 may be associated with a second user. The first barcode information 1525 and the second barcode information 1535 are configured as a two dimensional matrix of indicia, such as for example a Quick Response (QR) code.

In an exemplary embodiment, the barcode information 1525, 1535 is encoded and decoding using a non-industry standard coding scheme. The coding scheme may be useful in encoding contact information to barcode information 1525, 1535 using the coding engine operated by the source electronic handheld device 1505 and transmitting the barcode information to the target electronic handheld device 1510 for decoding the barcode information using the decoding engine. In an exemplary embodiment, the coding scheme is stored on the first device 1505 and the second device 1510 via mobile program application software (e.g., app). The software includes the proprietary coding scheme which is non-industry standard such that other software applications cannot decode the encoded contact application. By using a non-industry standard coding scheme and software application, the coding scheme may be operated on different operating systems (e.g., platforms) such that users having electronic devices using different operating systems may be able to exchange contact information using the system.

Also shown on the electronic handheld devices 1505, 1510 are a series of control buttons 1540, 1545 and an image reader 1550, 1555, such as for example an image and/or video camera. The optical communication link 1515 permits the image reader 1550 of the first device 1505 to scan and read the barcode information 1535 on the screen 1530 of the second device 1510 such that the barcode information 1535 may be decoded and the associated contact information stored in a data store or address book of the first device 1505. Likewise, the optical communication link 1515 permits the image reader 1555 of the second device 1510 to scan and read the barcode information 1525 on the screen 1520 of the first device 1505 such that the barcode information 1525 may be decoded and the associated contact information stored in a data store or address book of the second device 1510. The optical communications link 1515 provided by the image reader 1550, 1555 may advantageously avoid communication problems between electronic handheld devices having different operating systems. For example, since all devices 1505, 1510 will use the non-industry standard proprietary coding scheme, once visually scanned, the barcode information 1525, 1535 may be decoded independent of which operating system is running on either of the devices 1505, 1510.

FIG. 16 depicts a diagram of an exemplary customer-business interaction system. A customer business interaction system 1600 may be used with the contact exchange to provide businesses a method of gaining customer information while providing the customer with rewards or promotions for providing the customer information, for example.

In an exemplary embodiment, a customer device 1605, such as an electronic handheld device, such as a wireless mobile phone, includes customer contact information encoded using the non-industry standard coding scheme as previously described. The contact information may be encoded as barcode information 1610, as shown by the exemplary two-dimensional matrix. In an exemplary embodiment, the encoded contact information may include contact fields such as a first name, a last name, a phone number, a postal address, an email address, and a photograph. As detailed previously, the user may activate and deactivate contact fields as desired, where only the activated contact fields may be encoded in the barcode information 1610 for transmission.

The barcode information 1610 is transmitted via a communication link 1615 to a kiosk 1620, computer, or other receiving device. The communication link 1615 may be provided through optical or non-optical modes. The kiosk 1620 may be located within a store 1625 or simply be associated with a store 1625. For example, the kiosk 1620 may be located near the entrance of a physical store 1625 such that when a customer enters the store 1625 (or a predetermined portion thereof), the kiosk may transmit a request message. In response to the request message, the device 1605 may activate an app that operates in accordance with the contact exchange functionality described herein, and prepare to transmit an encoded contact information message to the kiosk 1620. As such, the customer may effortlessly transmit their encoded contact information via transmission of the barcode information 1610 through the communication link 1615 to the kiosk 1620. In another example, a series of kiosks 1620 may be located in a neutral or remote location, where each kiosk 1620 may be associated with a particular store 1625 or defined zones, departments or regions within the store 1625. A customer may choose with which kiosk 1620 associated with a particular store 1625 share selected elements of contact information.

In some embodiments, the app may (e.g., in response to a request message) prompt the user to define what elements of information are to be shared or not shared with any or each kiosk. In some implementations, individual kiosks may be associated with certain tags (e.g., women's clothing, television sets, shoes), and the user may select which types of tags should be associated with selected access to the user's contact information.

In an exemplary embodiment, once the kiosk 1620 receives encoded contact information, the kiosk 1620 may decode the contact information using the coding scheme, which may be non-industry standard and/or customized for the respective vendor, store, or application. For example, the coding scheme may be applied via a coding engine operated by the kiosk 1620. Each kiosk 1620 may include software including the proprietary coding scheme which is non-industry standard such that other software applications cannot decode the encoded contact application. In some embodiments, kiosks associated with different stores may utilize different coding schemes, such that a first kiosk associated with a first store uses a different coding scheme than a second kiosk associated with a second store so that contact information is only shared with user-authorized stores. In some implementations, an individual vendor may supply an app that includes a proprietary encoding and/or authorization scheme, to permit the user to control and manage information flow vendors.

The contact information may be stored within a local data store or a database 1630, which may be internal or remotely located with respect to the kiosk 1620. In some examples, the database 1630 may be external to the kiosk 1620 and the contact information communicated wirelessly between the kiosk 1620 and the remote database 1630. In some examples, the database 1630 may include the coding scheme for decoding the contact information such that the kiosk 1620 simply relays the encoded barcode information 1610 to the database 1630 for further processing.

In return for a user providing contact information, the user may receive in real-time an offer, such as for example a promotional item. In some other examples, the user may receive a reward, such as for example a discount for entering the store a certain number of times. In other examples, the user may receive a coupon or discount on an item, such as for example an item within the store. In some examples, the user receives the offer in real-time, such that the user receives the offer almost instantaneously after transmitting their contact information to the kiosk, such that the user may use the offer during their current store visit.

In some examples, the user may receive a discount on an item sold within the associated store 1625 for providing adequate contact information, such as for example a first name, a last name, and an email address. The offer may be communicated to the customer device 1605 via a communication link 1635. The offer may be received by the customer device 1605 as a text message or an email, for example. The offer may be communicated from the kiosk 1620, the database 1630, or other computer control center. In some examples, the offer may be encoded in a two-dimensional matrix, and may further be displayed on the screen of the customer device 1605. In some examples, the offer may require decoding by a non-industry standard coding scheme operated via a coding engine on the customer device 1605 or a coding engine on a store 1625 computer, such as for example a cash register.

The communication links 1615, 1635 may include a local area network in some exemplary embodiments. In other exemplary embodiments, one or both of the communication links 1615, 1635 may comprise a wide area network. In some exemplary embodiments, one or both of the communication links 1615, 1635 may comprise short-wavelength radio transmissions, such as for example a Bluetooth configured transmission. In some exemplary embodiments, one or both of the communication links 1615, 1635 may comprise a wireless transmission and in other exemplary embodiments, the communication link 1615, 1635 may comprise a wired transmission. In still other embodiments, the communication link 1615, 1635 may comprise an optical communication link 1615, 1635 provided by an image reader and a display.

Although various examples have been described with reference to the figures, other embodiments are possible. For example, software applications and associated methods may relate to the automatic sharing of preselected contact information between smart phones or other wireless computing devices. By way of example and not limitation, contact information may include a date, day, time, photograph, name, phone number, fax number, email address, mailing address and the location where the contact information was exchanged (e.g., which may be obtained via GPS or wifi-GPS). In some examples, a user may select which fields to provide to another user via an application. In some implementations, other types of information may be transferred in addition to or instead of contact information. For example, text-based documents (e.g., resumes) may be exchanged. In some other examples, social media contact information may be exchanged (e.g., Twitter, Facebook, LinkedIn).

Some embodiments may determine location at the time of the information exchange. The location information may be annotated to the contact record as a note, for example. Upon subsequent recall, the user may more readily recall the details of the contact exchange conversation, for example, by knowing where the contact took place. The contact information may be input via the user interface and/or automatically determined by geographic positioning systems that may be coupled to the processor of FIG. 4, for example.

In some implementations, contact information may be encoded into a 2-dimensional optical barcode, such as a QR code. In other examples, the optical encoding format may include an industry standard optically machine readable format.

In some examples, the contact information stored in the contact database may be formatted according to a prescribed and/or industry standard format. For example, some contact information may be suitably formatted in a Vcard (.vcf) file exchange format. The contact information so formatted may be encoded by an optical format encoding engine for transmission via a near field wireless communication protocol. Some communication media may involve formats such as Bluetooth, Wi-Fi, personal area network communication formats, or the like.

In some examples, a method of exchanging contact information may include encoding contact information associated with a contact using a coding scheme operated by a coding engine on a source electronic handheld device. The contact information may be encoded in a barcode information. The transmitted barcode information may be transmitted over a non-optical communication link to a target electronic handheld device. The target electronic handheld device may have a decoding engine programmed to decode the received barcode information in accordance with the coding scheme to recover the contact information. In response to receiving the transmitted barcode information by the target electronic handheld device, the target electronic handheld device may be configured to store the recovered contact information in a data store accessible by a contact information module of the target electronic handheld device in response to a retrieval command from a user of the target electronic handheld device.

In an exemplary embodiment, the coding scheme may comprise a non-industry standard coding scheme to encode and decode the contact information. For example, the coding scheme may be only common to the coding engine and coding scheme used by the contact information exchange system and no other programs or software application foreign to the contact information exchange system. The proprietary coding scheme permits the contact information exchange system to encode and decode contact information in a consistent format despite the operating system that may be being used to operate the coding engine and coding scheme. Thus, the non-industry standard coding scheme for encoding and decoding the contact information in a barcode information permits the contact information exchange system to be multi-platform or operating system independent.

In an exemplary embodiment, the source electronic handheld device may be configured to format the barcode information in a two dimensional matrix of indicia for display on a display device of the source electronic handheld device. In other exemplary embodiments, the barcode information may be configured in other machine readable formats, such as a UPC barcode symbol. In still other exemplary embodiments, the contact information may be encoded in other shapes or images non-representative of a barcode format.

In an exemplary embodiment, the barcode information may be transmitted wirelessly via a non-optical communication link. For example, the barcode information may be transmitted using short-wavelength radio transmissions via the non-optical communication link.

In an exemplary embodiment, contact fields on the source electronic handheld device may be manually enabled to enable transmission of the one or more contact fields within the encoded barcode information. For example, the user may enable transmission of a photo of the user by activating the contact field that may be populated by the photo. Upon transmission, the photo of the user may be transmitted via the barcode information to the target device since the respective photo contact field was enabled. In an exemplary embodiment, contact fields on the source electronic handheld device may be manually disabled to disable transmission of the one or more contact fields within the encoded barcode information. For example, the user may disable transmission of a photo of the user by deactivating the contact field that may be populated by the photo. Upon transmission, the photo of the user may not be transmitted via the barcode information to the target device since the respective photo contact field was disabled. In some exemplary embodiments, certain contact fields may be automatically enabled or disabled dependent upon the name of the user having the target device or the group that the target user belongs to in accordance with a naming or grouping scheme on the source device.

In some exemplary embodiments, in response to decoding the transmitted barcode information the target electronic handheld device may be configured to parse the contact information to determine one or more contact fields to populate with the decoded contact information within the data store of the target electronic handheld device. For example, if the photo contact field was disabled by the source device, the target device may determine that no photo was transmitted with the barcode information and choose not to populate the photo field on the target device for the user represented by the contact information transmitted by the barcode information.

In some exemplary embodiments, in response to receiving the transmitted barcode information the target electronic handheld device may be configured to display the barcode information upon a display screen of the target electronic handheld device. For example, the target device may display the barcode information on a respective display screen as such would indicate to the target user that the barcode information has been received and the target device may be ready to begin or has begun decoding the barcode information such that the contact information may be stored.

In some exemplary embodiments, a tag of the transmission of the barcode information may be generated, the tag including a time and a location of the transmission, wherein the tag may be encoded in the barcode information. For example, a time and location that a transmission of contact information was made between a source device and a target device may be encoded in the barcode information and stored in the data store of the target device. Thus, the target user may refer to the tag in assisting a remembrance of the user that may be represented by the contact information. In situations, where many contacts are made, the tag may be useful in assisting the target user where and when the target user met the respective contact. In some exemplary embodiments, the tag may be stored in the 'note' section of the electronic address book on the target device.

In some examples, the target electronic handheld device may require permission or authentication before receiving and/or decoding the barcode information from the source electronic handheld device. In some examples, a mutual passcode, such as a numerical passcode, may be required to be entered by the source device and/or the target device prior to transmission of the barcode information.

In accordance with various implementations described herein, contact exchange may be unidirectional or bidirectional between two devices. In some implementations, such as at a conference or promotional event, for example, a speaker or other individual may authorize unidirectionally broadcast of selected contact information to facilitate rapid mass delivery of contact information to a large number of receiving devices. Similarly, the speaker may also select automatic reception to permit a large number of other people to quickly and effortlessly transfer their contact information, for example, in response to an offer. For example, a speaker may open up his device to collect a large number of contact information for a limited period of time from individuals interested in an offer.

In some implementations, the software may have a way to organize contacts received during a certain period of time. For example, during a user defined period of time, all received contacts could be tagged with a predetermined label (e.g., networking contacts) or saved in a user-selected folder within a folder structure for organized storage and retrieval.

A number of implementations have been described. Nevertheless, it will be understood that various modification may be made. For example, advantageous results may be achieved if the steps of the disclosed techniques were performed in a different sequence, or if components of the disclosed systems were combined in a different manner, or if the components were supplemented with other components. Accordingly, other implementations are within the scope of the following claims.

What is claimed is:

1. A method of non-optically exchanging contact information, the method comprising:
    encoding contact information associated with a contact using a coding scheme operated by a coding engine on a source electronic handheld device, said contact information encoded in a barcode information; and
    transmitting said barcode information while encoded in barcode format over a non-optical communication link to a target electronic handheld device, wherein said target electronic handheld device has a decoding engine programmed to decode said received barcode information in accordance with said coding scheme to recover said contact information, wherein in response to receiving said transmitted barcode information said target electronic handheld device is configured to store recovered said contact information in a data store accessible by a contact information module of said target electronic handheld device in response to a retrieval command from a user of said target electronic handheld device.

2. The method of claim 1, wherein said coding scheme comprises a non-industry standard coding scheme to encode and decode said contact information.

3. The method of claim 1, wherein said source electronic handheld device is configured to format said barcode information in a two dimensional matrix of indicia for display on a display device of said source electronic handheld device.

4. The method of claim 1, including a step of transmitting said barcode information wirelessly via said non-optical communication link.

5. The method of claim 1, including a step of transmitting said barcode information wirelessly using short-wavelength radio transmissions via said non-optical communication link.

6. The method of claim 1, including a step of manually enabling one or more contact fields on said source electronic handheld device for enabling transmission of said one or more contact fields with said encoded barcode information.

7. The method of claim 1, including a step of manually disabling one or more contact fields on said source electronic handheld device for disabling transmission of said one or more contact fields with said encoded barcode information.

8. The method of claim 1, wherein in response to decoding said transmitted barcode information said target electronic handheld device is configured to parse said contact information to determine one or more contact fields to populate with said decoded contact information within said data store of said target electronic handheld device.

9. The method of claim 1, wherein in response to receiving said transmitted barcode information said target electronic handheld device is configured to display said barcode information upon a display screen of said target electronic handheld device.

10. The method of claim 1, including a step of generating a tag of said transmission of said barcode information, said tag including a time and a location of said transmission, wherein said tag is encoded in said barcode information.

11. The method of claim 1, including a step of providing a notification signal to said first electronic handheld device and said second electronic handheld device once said barcode information is transmitted to said second electronic handheld device.

12. A platform-independent method of exchanging contact information, the method comprising:
    encoding contact information associated with a contact using a coding scheme operated by a coding engine on a source electronic handheld device, said contact information encoded in a barcode information, wherein said coding scheme comprises a non-industry standard coding scheme to encode and decode said contact information;
    displaying said barcode information upon a display screen of said source electronic handheld device; and
    transmitting said barcode information while encoded in barcode format over a non-optical communication link to a target electronic handheld device, wherein said target electronic handheld device has a decoding engine programmed to decode said received barcode information in accordance with said coding scheme to recover said contact information, and wherein in response to receiving said transmitted barcode information said target electronic handheld device is configured to store recovered said contact information in a data store accessible by a contact information module of said target electronic handheld device in response to a retrieval command from a user of said target electronic handheld device.

13. The method of claim 12, wherein said source electronic handheld device is configured to format said barcode information in a two dimensional matrix of indicia.

14. The method of claim 12, including a step of manually enabling one or more contact fields on said source electronic handheld device for enabling transmission of said one or more contact fields with said encoded barcode information.

15. The method of claim 12, including a step of manually disabling one or more contact fields on said source electronic handheld device for disabling transmission of said one or more contact fields with said encoded barcode information.

16. The method of claim 12, wherein in response to decoding said transmitted barcode information said target electronic handheld device is configured to parse said contact information to determine one or more contact fields to populate with said decoded contact information within said data store of said target electronic handheld device.

17. The method of claim 12, wherein in response to receiving said transmitted barcode information said target electronic handheld device is configured to display said barcode information upon a display screen of said target electronic handheld device.

18. A system for non-optically exchanging contact information between two or more electronic handheld devices, the system comprising:
- a coding engine for encoding contact information in an optical encoding format; and,
- means for exchanging the encoded contact information while in barcode format by transmission via a non-optical communication link.

19. The system of claim 18, wherein said encoded contact information is in a format of a two-dimensional barcode.

20. The system of claim 19, wherein said two dimensional barcode is encoded in a non-industry standard format.

* * * * *